United States Patent Office.

THOMAS ANTISELL, OF WASHINGTON, DISTRICT OF COLUMBIA.

Letters Patent No. 95,626, dated October 5, 1869.

---

IMPROVEMENT IN INKS FOR PRINTING REVENUE, POSTAGE AND OTHER STAMPS, SO AS TO SECURE GREATER SAFETY AND PREVENT FRAUDS.

---

The Schedule referred to in these Letters Patent and making part of the same.

---

I, THOMAS ANTISELL, of the city of Washington, and District of Columbia, have invented certain Improvements in the Manufacture of Printing-Inks, of which the following is a specification.

These inks belong to the class of safety-inks which is not fugitive under mere solar or atmospheric influences, and is not durable or capable of resisting the action of the chemical reagents used in such cases.

Such inks are adapted for the uses of postage and revenue-stamps, bank-checks, notes, and drafts; and it is for the purpose of rendering such more sensitive, and to facilitate the detection of fraud, by the removal of the cancel-marks, or otherwise, that this improvement is designed; and the nature of my invention has relation to the use of inks in such documents—

First, by the use of an ink suitable for the ground or basic color of the stamp, or other document, which ink is so easily decomposed, and its visible qualities so distinctly and immediately altered, that it cannot be restored again, either to its original shade of color, or to its chemical constitution, when the effort to remove the cancelling-marks has been attempted.

Second, in the use of certain fugitive inks of a vegetable nature, when such inks are used either alone or in combination with the above-described basis ink.

To form the basis ink, only a few metallic salts seem adapted. They must be readily decomposed by an alkaline carbonate, with sufficient change of color to mark the decomposition. The salts of copper are of this class, and the acetate of copper, or verdigris, may be used, by mixing it with other materials, to give it substance and body, such as white lead, zinc-white, or flake-white. Care should be taken that these substances are colorless, or so little tinted as not to interfere with the color of the copper-salt; or the verdigris may be mixed with any pigment of a light tint, so as to vary the shade without marring the sensitiveness of the acetate to the action of alkalies and acids, when these latter are used for fraudulent purposes. Chrome-yellow may be thus used to brighten the tint of the verdigris without diminishing its sensitiveness.

An ink made of these two salts, as follows, verdigris, fifteen parts, chrome-yellow, one part, well blended together, and flake-white, or other suitable material, added to give body, and the whole rubbed up with boiled oil, forms a very sensitive ink. When an alkali, as sodic carbonate, is applied to it, the copper-salt is decomposed, and the tint changes at the point acted on. If an acid be now used to neutralize the alkaline action, the other element of the ink, the chrome-yellow, is now acted upon, and the ink is thus so irretrievably injured, that the stamp or document so tampered with is rendered worthless.

Ultramarine may enter into such inks, and be used as a substitute for chrome-yellow, but cannot replace the copper-salt.

Salts of nickel or cobalt may be used as the copper-salt for making such inks, but I prefer the use of verdigris.

Another ink which I have found to answer, is made of carbonate or acetate of copper, sixteen parts, extract of logwood, one part, ultramarine, one part, flake-white sufficient for body. These may be mixed with oil in the usual way, and ink thus formed is very sensitive to alkalies and acids. The proportions of the substances used may be varied from the foregoing, without altering the nature of the invention.

The majority of stamps, whether revenue or postage, are printed in only one color, and similarly of bank-documents; but two, or even three sensitive inks of different tints may be employed with advantage.

Those used for lettering, or vignettes, need to be very sensitive, and, for such, vegetable colors may form the basis. Litmus and logwood may be used, by treating these with a small quantity of acid, either vegetable or mineral, so as to change their colors to a bright red; then, mixing such substance with flake-white, or other suitable substance, and boiled oil, an ink is produced which is highly sensitive to alkalies. A brighter tint may be given by the addition of carmine, vermilion, or other mineral red, but this is no essential part of the invention.

The proportions of these ingredients may vary within some range, but I find the following proportions to answer the purpose, viz, reddened litmus, fifteen parts, carmine, one part, flake-white sufficient for body. These to be mixed up with boiled oil, or other suitable menstruum for plate-printing.

Other shades of colored ink may be made by varying the vegetable substance, as by the use of Brazil wood, dragon's blood, or indigo combined with a deoxidizing-substance. I do not, therefore, limit myself to the use of litmus alone or logwood alone.

Having thus described my invention,

What I claim as my improvement, and desire to secure by Letters Patent, is—

1. An ink, composed as described, having for its basis a salt of copper, or other metal acting similarly, as set forth.

2. An ink, having for its basis a sensitive vegetable color, acting in the manner and for the purposes set forth.

3. The combination of a vegetable-color ink, as described, with the metallic ink, set forth, on the same print by successive application.

Witnesses:         THOMAS ANTISELL.
  EDM. F. BROWN,
  WM. H. McCABE.